United States Patent [19]

Krishnamurthy et al.

[11] Patent Number: 4,778,665

[45] Date of Patent: Oct. 18, 1988

[54] ABATEMENT OF $NO_x$ IN EXHAUST GASES

[75] Inventors: Sowmithri Krishnamurthy, Cherry Hill; John P. McWilliams, Woodbury; David A. Pappal, Sewell; Catherine T. Sigal, Pennington, all of N.J.; Thomas R. Kiliany, Jr., Baytown, Tex.

[73] Assignee: Mobil Oil Corporation, New York, N.Y.

[21] Appl. No.: 12,097

[22] Filed: Feb. 6, 1987

Related U.S. Application Data

[63] Continuation-in-part of Ser. No. 906,579, Sep. 9, 1986, abandoned, which is a continuation of Ser. No. 763,582, Aug. 8, 1985, abandoned.

[51] Int. Cl.$^4$ .......................... B01J 8/00; C01B 21/00
[52] U.S. Cl. .................... 423/239; 423/235; 208/113; 208/120
[58] Field of Search .................. 423/235 D, 235, 239, 423/239 A; 208/113, 118, 120

[56] References Cited

U.S. PATENT DOCUMENTS

| | | | |
|---|---|---|---|
| 3,476,508 | 11/1969 | Kearby et al. | 23/2 |
| 3,689,212 | 9/1972 | Petit et al. | 423/239 |
| 3,895,094 | 7/1975 | Carter et al. | 423/239 |
| 3,900,554 | 8/1975 | Lyon | 423/235 |
| 4,043,939 | 8/1977 | Kassoka | 252/416 |
| 4,064,888 | 9/1977 | Maeshima et al. | 423/239 |
| 4,097,576 | 6/1978 | Tamura et al. | 423/239 A |
| 4,104,361 | 8/1978 | Nishikawa et al. | 423/239 |
| 4,157,375 | 6/1979 | Brown et al. | 423/239 |
| 4,199,555 | 4/1980 | Itoh et al. | 423/239 |
| 4,220,632 | 9/1980 | Pence et al. | 423/239 |
| 4,268,488 | 5/1981 | Ginger | 423/239 A |
| 4,297,328 | 10/1981 | Ritscher et al. | 423/213.2 |
| 4,302,431 | 11/1981 | Atsukawa et al. | 423/239 |
| 4,434,147 | 2/1984 | Dimpfl et al. | 423/235 |
| 4,473,535 | 9/1984 | Kittrell et al. | 423/239 |
| 4,564,604 | 1/1986 | Iida et al. | 502/64 |

FOREIGN PATENT DOCUMENTS

| | | |
|---|---|---|
| 51-69476 | 6/1976 | Japan ................ 423/239 |
| 214028 | 11/1983 | Japan. |
| 2017520 | 10/1979 | United Kingdom. |

Primary Examiner—Gregory A. Heller
Attorney, Agent, or Firm—Alexander J. McKillop; Michael G. Gilman

[57] ABSTRACT

Abatement of nitrogen oxides in an industrial exhaust gas is effected by reduction of the nitrogen oxides with ammonia in the presence of a catalyst comprising a porous crystalline siliceous solid such as a ZSM-5 type zeolite. Fast responses to changes of $NO_x$ load is achieved with a zeolite of low to moderate acid activity. The catalyst may be virgin catalyst, aged catalyst previously used for the conversion of a hydrocarbon or an organic compound, or artificially aged catalyst.

30 Claims, 4 Drawing Sheets

FIG. 1
LABORATORY APPARATUS

FIG. 2
PILOT ABATEMENT UNIT

FIG. 3
PILOT ABATEMENT,
EXAMPLE 7

FIG. 6
EMISSIONS

FIG. 7

ABATEMENT OF NO$_x$ IN EXHAUST GASES

CROSS REFERENCE TO RELATED APPLICATIONS

This application is a continuation-in-part of application Ser. No. 906,579 filed Sept. 9, 1986, now abandoned which in turn is a filewrapper continuation of application Ser. No. 763,582 filed Aug. 8, 1985, now abandoned.

FIELD OF THE INVENTION

This invention is concerned with the abatement of nitrogen oxides in industrial exhaust gases. In particular, it is concerned with a catalytic method for efficiently reacting the nitrogen oxides with ammonia before discharge to the atmosphere. It is more particularly concerned with a controllable process for the abatement of nitrogen oxides which avoids the transient discharge of excessive concentrations of both nitrogen oxides and ammonia as a result of changes in NO$_x$ feed rate to the reactor.

BACKGROUND OF THE INVENTION

Although several nitrogen oxides are known which are relatively stable at ambient conditions, it is generally recognized that two of these, viz. nitric oxide (NO) and nitrogen dioxide (NO$_2$), are the principle contributors to smog and other undesirable environmental effects when they are discharged into the atmosphere. These effects will not be discussed further here since they are well recognized and have led various government authorities to restrict industrial emissions in an attempt to limit the level of the oxides in the atmosphere. Nitric oxide and nitrogen dioxide, under appropriate conditions, are interconvertible according to the equation $$2NO + \tfrac{1}{2}O_2 = 2NO_2.$$

For purposes of the present invention, NO$_x$ will be used herein to represent nitric oxide, nitrogen dioxide, and mixtures thereof.

Formation on man-made nitrogen oxides from the elements occurs in the high temperature zones of combustion processes. The internal combustion engine, and coal or air-fired furnaces, boilers and incinerators, all contribute to NO$_x$ emissions. In general, fuel-rich combustion mixtures produce exhaust gases with lower contents of NO$_x$ than do lean mixtures. Although the concentrations of NO$_x$ in the exhaust gases produced by combustion usually are low, the aggregate amounts discharged in industrial and/or highly populated areas is adequate to cause problems. Other industrial sources of pollution also exist. These are associated with the manufacture of nitric acid, with nitration of organic chemicals, and with other chemical operations such as the reprocessing of spent nuclear fuel rods by dissolution in nitric acid to recover uranyl nitrate followed by calcination to convert the nitrate to uranium oxide. In these instances the waste gases may contain relatively high levels of NO$_x$, such as from 0.1% up to 2% to 3%.

The so-called "stable" nitrogen oxides have in common the somewhat peculiar property that although they are thermodynamically very unstable with respect to decomposition into elemental oxygen and nitrogen, no simple, economical method has been described for inducing this decomposition. It has been discovered, however, that adding a reductant such as ammonia to the exhaust gas can, under appropriate reaction conditions, convert NO$_x$ to elemental nitrogen and steam.

U.S. Pat. No. 3,900,554 to Lyon describes a homogeneous gas phase reaction to remove NO$_x$ from combustion effluents by adding 0.4 to 10 mols (preferably 0.5 to 1.5 mols) of ammonia followed by heating to 1600° C. to 2000° C. The NO$_x$ content is lowered as a result of its being reduced to nitrogen by reaction with ammonia. The method is reported to work best if hydrocarbon is also added to the mixture.

U.S. Pat. No. 4,220,632 to Pence et al. discloses a process for reducing noxious nitrogen oxides from a fossil-fuel-fired power generation plant, or from other industrial plant off-gas stream, to elemental nitrogen and/or innocuous nitrogen oxides employing ammonia as reductant and, as catalyst, the hydrogen or sodium form of a zeolite having pore openings of about 3 to 10 Angstroms.

BRIEF SUMMARY OF THE INVENTION

It has now been found that intermediate pore-size, highly siliceous crystalline zeolites having a silica to alumina ratio preferably at least about 50 and a Constraint Index in the range of 1 to 12, as more fully described hereinbelow, provide very efficient catalysts for the selective conversion of NO$_x$ in industrial exhaust gases. This reduction proceeds approximately according to equations (1) and (2).

$$2NO_2 + 4NH_3 + O_2 \rightarrow 3N_2 + 6H_2O \tag{1}$$

$$4NO + 4NH_3 + O_2 \rightarrow 4N_2 + 6H_2O \tag{2}$$

The process of this invention is conducted by premixing the exhaust gas with ammonia at a temperature of at least about 200° C. and contacting the mixture with the catalyst at a temperature of 200° C. to about 600° C. at a space velocity effective to induce the desired degree of conversion. In the event that the exhaust gas contains insufficient oxygen to at least satisfy the stoichiometry of equations (1) and (2), it is preferred to also include in the mixture adequate oxygen-containing gas such as air to provide the oxygen.

The method of this invention is advantageous in providing effective conversion at temperatures of 400° C. and lower, and in providing very rapid response to changes in ammonia concentration (i.e. excellent control). The zeolite catalyst of this invention is preferably at least partially in the hydrogen form, but it may advantageously contain up to about 1 wt % of a platinum group metal without loss of selective activity for NO$_x$ reduction even at about 350° C. The term "platinum group" as used herein includes the metals of periods 5 and 6 of Group VIII of the Periodic Table, viz. Ru, Rh, Pd, Os, Ir and Pt. Platinum and palladium are preferred.

In one embodiment of this invention, the abatement catalyst is a commercially spent catalyst removed from service in converting methanol or a hydrocarbon, said catalyst comprising a highly siliceous zeolite having a silica to alumina ratio of at least 20 and preferably of at least about 50 and a Constraint Index of 1 to 12. Such catalyst is highly effective for selective NO$_x$ conversion although of no further utility in catalyzing conversion of the organic compound.

Other embodiments are described elsewhere in this application including the claims.

DETAILED DESCRIPTION AND SPECIFIC EMBODIMENTS

The term "industrial exhaust gas" as used herein means any waste gas which is formed in an industrial process or operation and which is normally disposed of by discharge to the atmosphere. The composition of such a gas varies and depends on the particular process or operation which leads to its formation. When formed in the combustion of fossil fuels, it will generally contain nitrogen, steam and carbon dioxide in addition to low levels, such as up to about 1000 ppm, of nitric oxide plus nitrogen dioxide. Sulfur-containing fuels will produce an exhaust gas that contains some $SO_2$. Rich fuel-air mixtures will generally produce an exhaust gas that contains little if any free oxygen, and some carbon monoxide. Lean fuel air mixtures, i.e. mixtures in which more air is provided than is stoichiometrically required to completely combust the fuel, will form an exhaust gas that contains gaseous oxygen. The foregoing is a general description given to illustrate the variability in the composition of the exhaust gases from fossil fuel combustion. Other industrial processes such as nitration, uranium recovery, and calcining nitrate salt-containing solids produce exhaust gases which can have compositions different from those noted above. They may be substantially devoid of steam, for example, and may contain very high concentrations of nitrogen or other inert gases.

The process of this invention requires that the $NO_x$-contaminated exhaust gas be mixed at a temperature of at least about 200° C. with gaseous ammonia. That this mixture be formed at elevated temperature is important to avoid the formation of solid ammonium nitrite or nitrate, which is potentially hazardous. The amount of ammonia included in the mixture should be approximately the amount required to stoichiometrically react with the $NO_x$ present in the exhaust gases. If the mixture of ammonia and exhaust gas contains oxygen in an amount which at least satisfies the stoichiometry of Equations (1) and (2) shown above, then the stoichiometry is that given by those equations. In the event that the exhaust gas contains less oxygen than required by (1) and (2), it is preferred to add at least the required oxygen, although this invention is operable even with a deficiency of oxygen. With a deficiency, however, the stoichiometry changes, requiring somewhat less ammonia. This is illustrated by equations (3) and (4), which represent the stoichiometry in the total absence of oxygen.

$$6NO_2 + 8NH_3 \rightarrow 7N_2 + 12H_2O \quad (3)$$

$$6NO + 4NH_3 \rightarrow 5N_2 + 6H_2O \quad (4)$$

As used herein, the expression "approximate stoichiometric amount of ammonia" is intended to mean about 0.75 to about 1.25 the molar amount of ammonia indicated in equations (1) and (2) when excess oxygen is present, these amounts being adjusted to reflect the somewhat lesser demand when operating with a deficiency of oxygen.

The mixture formed as described above is contacted with a crystalline zeolite molecular sieve catalyst having the properties described above. Crystalline zeolites are a known type of porous crystalline siliceous solid, and are described in Breck, "Zeolite Molecular Sieves", John Wiley and Sons, N.Y., N.Y. (1974), the entire content of which is incorporated herein by reference for background purposes.

The most common crystalline zeolites are those having robust 3-dimensional aluminosilicate frameworks, and a large number of these are described by Breck (ibid). However, it is known that analogous framework structures may be synthesized with gallium instead of aluminum as the trivalent heteroatom to form gallosilicates. Similarly, structures have been reported in which iron, boron, or other elements replace part or mostly all of the aluminum. And, crystalline materials having essentially the same crystal structure as a known zeolite, as evidenced by X-ray diffraction, but consisting essentially of silica, have been described. Some investigators have interpreted the term "zeolite" in a narrow sense, restricting it to framework compositions formed from silica and alumina. In the present application, such restricted definition is believed to be unduly narrow. The term "porous crystalline siliceous solid" is used herein to mean a material having a robust 3-dimensional framework having uniform pores, such as described by Breck, and having silica as the principal framework element, regardless of what other framework elements may be present. The term "zeolite" is used herein to describe structures in which silica is the principal framework constituent and in which aluminum is the predominant trivalent heteroatom.

Contacting is conducted at a temperature of 200° C. to about 600° C., and preferably at about 250° C. to about 550° C., and at a gas hourly space velocity (vols. of gas at STP per volume of catalyst per hour) adjusted to provide the desired conversion. The GHSV can be from about 750 to 25,000 $hr^{-1}$, and preferably from 1000 to about 7500$hr^{-1}$.

In general, since the reaction is exothermic but low concentrations of $NO_x$ are present, adequate temperature control is readily achieved with a simple stationary fixed-bed of catalyst. However, other contacting means are contemplated, such as contacting with a fixed fluid bed, a transport bed, and a monolithic catalyst structure such as a honeycomb. The process of this invention is operable at subatmospheric to superatmospheric pressure, e.g. at 5 to 500 psia, and preferably at 10 to 50 psia, i.e. near atmospheric pressure.

A catalyst useful in this invention will now be described in detail. It comprises an intermediate pore size zeolite having a silica to alumina ratio of at least about 50 and a Constraint Index of about 1 to 12. The Constraint Index qualifies it as having an intermediate pore size, as will be more fully described below. Examples of such zeolites include ZSM-5, ZSM-11, ZSM-12, ZSM-21, ZSM-23, ZSM-35, ZSM-38 and ZSM-48. Such zeolites are sometimes referred to as of the ZSM-5 type, and this term may sometimes be used herein to designate zeolites useful in this invention.

The ZSM-5 type zeolites are members of a novel class of zeolites that exhibit unusual properties. Although these zeolites have unusually low alumina contents, i.e. high silica to alumina ratios, they are active for converting organic compounds. The activity is surprising since catalytic activity is generally attributed to framework aluminum atoms and/or cations associated with these aluminum atoms. These zeolites have an intracrystalline sorption capacity for normal hexane which is greater than that for water, i.e. they exhibit "hydrophobic" properties.

An important characteristic of the crystal structure of this class of zeolites is that it provides constrained access to and egress from the intracrystalline free space by virtue of having an effective pore size intermediate between the small pore Linde A and the large pore Linde X, i.e. the pore windows of the structure have about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra.

The silica to alumina ratio referred to may be determined by conventional analysis. This ratio is meant to represent, as closely as possible, the ratio in the rigid anionic framework of the zeolite crystal and to exclude aluminum in the binder or in cationic or other form within the channels.

The ZSM-5 type zeolites referred to herein have an effective pore size such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of oxygen atoms, then access to molecules of larger cross-section than normal hexane is excluded and the zeolite is not of the ZSM-5 type. Windows of 10-membered rings are preferred, although in some instances excessive puckering of the rings or pore blockage may render these zeolites ineffective.

Rather than attempt to judge from crystal structure whether or not a zeolite possesses the necessary constrained access to molecules larger than normal paraffins, a simple determination of the "Constraint Index", or C.I., as herein defined may be made by passing continuously a mixture of an equal weight of normal hexane and 3-methylpentane over a small sample, approximately one gram or less, of zeolite at atmospheric pressure according to the following porcedure. A sample of the zeolite, in the form of pellets or extrudate, is crushed to a particle size about that of coarse sand and mounted in a glass tube. Prior to testing, the zeolite is treated with a stream of air at 1000° F. for at least 15 minutes. The zeolite is then flushed with helium and the temperature is adjusted between 550° F. and 950° F. to give an overall conversion between 10% and 60%. The mixture of hydrocarbons is passed at 1 liquid hourly space velocity (i.e. 1 volume of liquid hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The C.I. is calculated as follows:

$$C.I. = \frac{\log (\text{fraction of n-hexane remaining})}{\log (\text{fraction of 3-methylpentane remaining})}$$

The Constraint Index approximates the ratio of the cracking rate constants for the two hydrocarbons. Zeolites suitable for the present invention are those having a Constraint Index of 1 to 12. C.I. values for some typical zeolites are:

TABLE I

| CAS | C.I. |
|---|---|
| ZSM-4 | 0.5 |
| ZSM-5 | 8.3 |
| ZSM-11 | 8.7 |
| ZSM-12 | 2 |
| ZSM-23 | 9.1 |
| ZSM-35 | 4.5 |
| ZSM-38 | 2 |
| TMA Offretite | 3.7 |
| Beta | 0.6 |
| H-Zeolon (mordenite) | 0.4 |
| REY | 0.4 |
| Amorphous Silica-Alumina | 0.6 |
| Erionite | 38 |

The above-described Constraint Index is an important definition of zeolites which are useful in the instant invention. The very nature of this parameter and the recited technique by which it is determined, however, admit of the possibility that a given zeolite can be tested under somewhat different conditions and thereby have different Constraint Indices. Constraint Index seems to vary somewhat with severity of operation (conversion) and the presence or absence of binders. Therefore, it will be appreciated that it may be possible to so select test conditions to establish more than one value in the range of 1 to 12 for the Constraint Index of a particular zeolite. Such a zeolite exhibits the constrained access as herein defined and is to be regarded as having a Constraint Index of 1 to 12. Also contemplated herein as having a Constraint Index of 1 to 12 and therefore within the scope of the novel class of highly siliceous zeolites are those zeolites which, when tested under two or more sets of conditions within the above-specified ranges of temperature and conversion, produce a value of the Constraint Index slightly less than 1, e.g. 0.9, or somewhat greater than 12, e.g. 14 or 15, with at least one other value of 1 to 12. Thus, it should be understood that the Constraint Index value as used herein is an inclusive rather than an exclusive value. That is, a zeolite when tested by any combination of conditions within the testing definition set forth hereinabove and found to have a Constraint Index of 1 to 12 is intended to be included in the instant catalyst definition regardless that the same identical zeolite tested under other defined conditions may give a Constraint Index value outside of 1 to 12.

For ZSM-5 type zeolites of very high silica to alumina ratio, such as 1600:1, the Constraint Index cannot be measured reliably because of the low activity of the zeolite. In such cases reliance on X-ray pattern is useful.

The class of zeolites defined herein is exemplified by ZSM-5, ZSM-11, ZSM-12, ZSM-21, ZSM-23, ZSM-35, ZSM-38, ZSM- 48, and other similar materials.

U.S. Pat. No. 3,702,886 describing and claiming ZSM-5 is incorporated herein by reference.

ZSM-11 is more particularly described in U.S. Pat. No. 3,709,979, the entire content of which is incorporated herein by reference.

ZSM-12 is more particularly described in U.S. Pat. No. 3,832,449, the entire content of which is incorporated herein by reference.

ZSM-21 is more particularly described in U.S. Pat. No. 4,046,859, the entire content of which is incorporated herein by reference.

ZSM-23 is more particularly described in U.S. Pat. No. 4,076,842, the entire content of which is incorporated herein by reference.

ZSM-35 is more particularly described in U.S. Pat. No. 4,016,245, the entire content of which is incorporated herein by reference.

ZSM-38 is more particulary described in U.S. Pat. No. 4,046,859, the entire content of which is incorporated herein by reference.

The specific zeolites described, when prepared in the presence of organic cations, are substantially catalytically inactive, possibly because the intra-crystalline free space is occupied by organic cations from the forming solution. These cations are removed by heating in an inert atmosphere at 1000° F. for one hour, for example, followed by base exchange with ammonium salts followed by calcination at 1000° F. in air.

The ZSM-5 type zeolites referred to herein have a crystal framework density, in the dry hydrogen form, of not less than about 1.6 grams per cubic centimeter. The dry density for known crystal structures may be calculated from the number of silicon plus aluminum atoms per 1000 cubic Angstroms, as given, e.g., on Page 19 of the article on Zeolite Structure by W. M. Meier. This paper, the entire contents of which are incorporated herein by reference, is included in "Proceedings of the Conference on Molecular Sieves, London, April 1967," published by the Society of Chemical Industry, London, 1968. When the crystal structure is unknown, the crystal framework density may be determined by classical pycnometer techniques. For example, it may be determined by immersing the dry hydrogen form of the zeolite in an organic solvent not sorbed by the crystal. Or, the crystal density may be determined by mercury porosimetry, since mercury will fill the interstices between crystal but will not penetrate the intracrystalline free space.

Crystal framework densities of some typical zeolites, including some which are not within the purview of this invention, are:

TABLE II

| Zeolite | Void Volume | Framework Density |
|---|---|---|
| Ferrierite | 0.28 cc/cc | 1.76 g/cc |
| Mordenite | .28 | 1.7 |
| ZSM-5, 11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM-4, Omega | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

TABLE II-continued

The ZSM-5 zeolites may be incorporated in another material usually referred to as a matrix or binder. Such matrix materials include synthetic or naturally occuring substances as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as alumina, silica-alumina and silica-magnesia. The matrix may be in the form of a cogel. The relative proportions of zeolite component and inorganic oxide gel matrix on an anhydrous basis may vary widely with the zeolite content ranging from between about 5 to about 99 percent by weight and more usually in the range of about 10 to about 80 percent by weight of the dry composite.

The ZSM-5 type zeolites, in the hydrogen form and in certain divalent metal or polyvalent metal-exchange forms, have acid catalytic activity. The term "acid catalytic activity" as used herein refers to the effectiveness of the zeolite, when in suitable form, for catalyzing reactions known to be promoted by so-called acid catalysts. Catalytic cracking, hydrocracking, skelatal isomerization, catalytic dewaxing, and various aromatic hydrocarbon reactions such as alkylation, dealkylation, isomerization and disproportionation, are hydrocarbon conversion reactions which fall in the category of acid catalyzed reactions. Other reactions, such as alcohol dehydration, are also in this class.

As is known in the art, the acid catalytic activity of a zeolite may be measured by its "alpha value", which is the ratio of the rate constant of a test sample for cracking normal hexane to the rate constant of a standard reference catalyst. Thus, an alpha value=1 means that the test sample and the reference standard have about the same activity. The alpha test is described in U.S. Pat. No. 3,354,078 and in The Journal of Catalysis, Vol. IV, pp. 522–529 (August 1965), both of which are incorporated herein by reference. Measurement of the "alpha value" is useful to assess the extent of catalyst activity of fresh catalyst as well as used and spent catalysts.

The alpha value of an essentially pure zeolite (or other crystalline silicate) may be measured by first pelleting the zeolite powder, crushing and sizing the pellets, and determining the value for the crushed material. Determination also may be made on zeolites contained in a binder, for which case the binder normally acts simply as a diluent, reducing the alpha value per gram of total sample. In such instances the value for the pure zeolite itself is obtained by dividing the observed alpha value by the fractional weight content of the zeolite. In all instances wherein the alpha content of a sample is reported herein, the value shown is on the basis of 100% zeolite unless explicitly stated to be otherwise by a notation such as (65 wt % zeolite).

It is known that zeolites may be ion-exchanged to convert them to various cation-exchanged forms. While it is contemplated that various ion-exchanged forms of ZSM-5-type zeolites can be useful in the present invention, the hydrogen form of ZSM-5 is preferred. It has been observed, e.g. with certain hydrogen-form ZSM-5 materials that the effect of adjusting the $NH_3$ concentration takes place with substantially no lapse of time. This is a distinct advantage from the point of view of automated abatement control since variations of $NO_x$ in the exhaust gas can be accommodated with minimum or no intermittent emissions of either unconverted $NO_x$ or excess $NH_3$. Of the ZSM-5 type catalysts, ZSM-5 predominantly in the hydrogen form is preferred. The catalyst, however, can contain about 1 wt % Ni or from 2 ppm to about 1 wt % platinum without loss of this fast response. Although adding to the cost of the catalyst, low levels of platinum with ZSM-5 appear to provide a substantial effect as promoter for $NO_x$ conversion.

In one aspect and embodiment of the present invention, ZSM-5 partially in the hydrogen form which has been previously used in an acid-catalyzed organic conversion reaction until it has become spent, i.e. not regenerable to an economically useful level, has been found to be very active for $NO_x$ abatement. For example, a dewaxing catalyst which is no longer useful, and has an alpha value of less than about 40 (65 wt % zeolite) was found very effective for catalytic $NO_x$ abatement. This empirical finding is not understood. Nonetheless, it provides an inexpensive source of $NO_x$ abatement catalyst. Carbon deposits that are on the spent catalyst should be removed by calcination prior to catalytic use in $NO_x$ abatement. The term "spent", as used herein, does not necessarily mean that the catalyst has no activity at all, but rather that its activity is reduced and/or its cycle life is reduced, and/or its selectivity is reduced, to the point where it should be discharged. Typically, a spent dewaxing catalyst, for example, has an alpha value of about 40 (65 wt % zeolite content) while the (steamed) fresh catalyst had an alpha value of 65 (65 wt % zeolite content), and the spent catalyst has a reduced cycle time between regenerations.

In another embodiment of the present invention, the exhaust gases are provided by the calcination of a solid comprising a nitrate metal salt. The calcination may be conducted in the presence or absence of air.

In still another embodiment of this invention, the exhaust gases are provided by stationary internal combustion engines such as two cycle engines operating with a lean mixture of natural gas as fuel. The $NO_x$ content of the exhaust gases varies with the rate of feed of fuel, becoming substantial at high loadings. This is exemplified for a 1100 HP GMVA-8 gas compressor in FIG. 6 of the drawing.

In still another embodiment of this invention, the exhaust gases are provided by the regenerator of a fluid catalytic cracking unit, such as described in U.S. Pat. No. 4,072,600 to Schwartz, incorporated herein by reference. A representative exhaust gas composition is as follows:

| Constituent | wt % |
|---|---|
| $CO_2$ | 12 |

-continued

| Constituent | |
|---|---|
| $O_2$ | 6 |
| $H_2O$ | 15 |
| $N_2$ | 67 |
| | ppm (v) |
| $SO_2$ | 410 |
| $SO_3$ | 70 |
| $NO_x$ | 200 |
| CO | 1500 |

In this particular application, hydrogen form ZSM-5 is a preferred zeolite, although base exchange with a base metal such as chromium, maganese, cobalt, nickel, or copper can be advantageous.

In one configuration, fluidizable particles of the $NO_x$-reduction catalyst are injected into the flue gas duct from the regenerator and the ammonia required for the $NO_x$-reduction is added either at the same point or upstream of the point at which catalyst is injected. At an appropriate point downstream of the ammonia injection, after reduction of the $NO_x$, the particles are recovered by a cyclone separator or by an electrostatic precipitator, and the flue gas then is discharged. The particles are disposed of or recirculated.

In a second configuration the flue gas from the regenerator is passed from the flue gas duct of the regenerator to a moving bed or a fluid bed of the $NO_x$-reduction catalyst particles where $NO_x$-reduction occurs, and the flue gas is then discharged.

In a third configuration, the flue gas is mixed with the requisite ammonia according to this invention and the mixture passed parallel to the catalyst surface, said surface being provided disposing the catalyst in a honeycomb or layer configuration.

Regardless of which of the foregoing configurations is used, a particularly advantageous embodiment wherein flue gas from a catalytic cracking unit is treated according to this invention is that embodiment in which a spent ZSM-5 hydrocarbon conversion catalyst is used as the $NO_x$-reduction catalyst.

This invention will now be illustrated by examples. The examples are for illustrative purposes only and are not to be construed as limiting the scope of the invention, which scope is defined by this entire specification including the appended claims.

EXAMPLES

Figure 1:
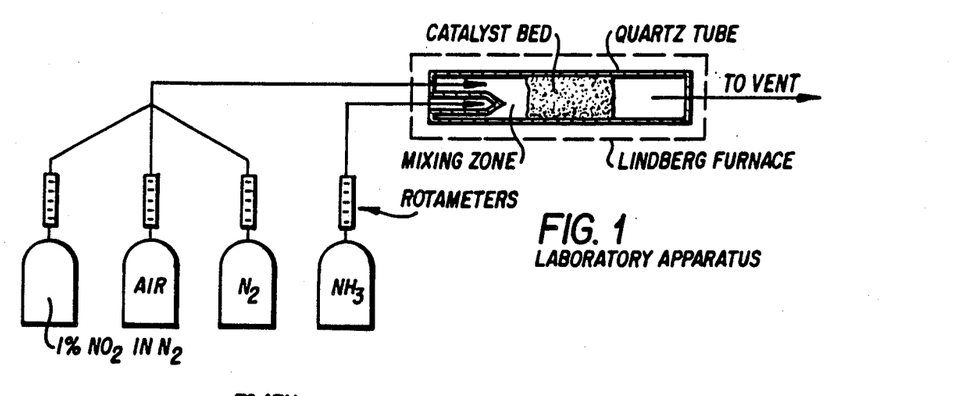
FIG. 1 illustrates laboratory apparatus for testing catalyst.

Examples 1–6 describe laboratory experiments. A schematic drawing of the apparatus used in these experiments is shown in FIG. 1. From 10 to 40 cc of catalyst was placed in a one inch diameter quartz tubular reactor which was heated by a Lindberg furnace. Mixtures of $NO_2$, air and $N_2$ entered the reactor through a common line. $NH_3$ was injected through a separate line into the preheated mixing zone in front of the catalyst bed. The mixing zone was maintained at a temperature of at least about 200° C. to avoid ammonium nitrate formation. Drager tubes (not shown) were used to measure $NO_x$ and $NH_3$ concentrations. The amounts of ammonia and air used corresponded stoichiometrically to the following balanced equation The apparatus was provided with a thermocouple (not shown) located at the center of the tubular reactor and about in the center of the catalyst bed.

Example 1

In this experiment quartz chips were loaded into the reactor described above. At 266° C., even at low space velocity, no conversion of $NO_2$ was observed. The details and results are summarized in Table I.

Example 2

This experiment was conducted with Zeolon 900H, a synthetic hydrogen mordenite obtained from the Norton Company in the form of 1/16 inch diameter extrudate. The extrudate had a silica to alumina ratio of about 12, it contained 450 ppm of sodium, and it had an alpha activity of 35. Hydrogen mordenite is a prior art catalyst. The details and results of this experiment are shown in Table III.

Example 3

An $NH_4NaY$ powder was obtained from the Linde Air Products division of Union Carbide Corp. It had the composition $(NH_4)_9(Na)(Al_2O_3)_{10}(SiO_2)_{23}$. This was ammonium exchanged twice followed by air calcination to produce the hydrogen form. The calcined product had a sodium concentration of 1.7 wt % based on ash weight.

The powder was charged to the reactor and evaluated as described in Examples 1-3. The details and results of this experiment are shown in Table III.

TABLE III

Results, Examples 1-3

| Ex. | Catalyst | Temp., °C. | GHSV at 21° C. | Inlet $NO_2$ Conc. | Outlet $NO_2$ Conc. | % Conv. |
|---|---|---|---|---|---|---|
| 1. | Quartz Chips | 266 | 450 hr$^{-1}$ | 750 ppm | 750 ppm | 0 |
| 2. | H—Mordenite Extrudate | 282 | 2100 | 5000 | 600 | 88 |
| 3. | HY Zeolite Powder | 302 | 1200 | 1500 | 15 | 99 |
|  |  | 302 | 1700 | 2500 | 1 | 99 |
|  |  | 302 | 4800 | 5000 | 5 | 99 |

Example 4

A hydrogen form ZSM-5 (HZSM-5) (1/16 inch) extrudate containing 65 wt % zeolite and 35 wt % alumina binder was tested for effectiveness at 260° C., 302° C., 371° C. and 427° C. with the method described for Examples 1-3. The details of the experiment and the results are shown in Table IV.

TABLE IV

HZSM-5

| Temp., °C. | GHSV at 21° C. | Inlet $NO_2$ Conc., ppm | % Conv. |
|---|---|---|---|
| 260 | 460 hr$^{-1}$ | 500–1000 | 98 |
| 302 | 5600 | 4000–3000 | 79 |
| 302 | 2000 | 1000–2000 | 95 |
| 302 | 1400 | 1000–2000 | 99 |
| 371 | 5600 | 3000–4000 | 57 |
| 427 | 460 | 1000–2000 | 99 |

Example 5

A ZSM-5 extrudate of the type used in Example 4, except that it contained about 1.0 wt % Ni (NiZSM-5), was tested as in Example 4. The details of the experiment and the results are shown in Table V.

TABLE V

NiZSM-5

| Temp., °C. | GHSV at 70° F. | Inlet $NO_2$ Conc., ppm | % Conv. |
|---|---|---|---|
| 260 | 250 hr$^{-1}$ | 1000–2000 | 99 |
| 302 | 5000 | 3000–4000 | 71 |
| 302 | 2600 | 2000–3000 | 72 |
| 302 | 1500 | 1000–2000 | 99 |
| 371 | 5000 | 3000–4000 | 43 |
| 371 | 2600 | 4000–5000 | 80 |
| 427 | 250 | 1000–2000 | 99 |

Example 6

In this experiment a porous inorganic catalyst was impregnated with nitrate salt and dried. This preparation was used to generate $NO_x$ in a simulated calcination, and the exhaust gas ws treated by the method of this invention. The $NO_x$ conversion catalyst was a ZSM-5 extrudate similar to that used in Example 4 except that it contained 0.6 wt % platinum (PtZSM-5).

The PtZSM-5 conversion catalyst (16 cc) was placed in the quartz tube as described in Examples 1-3, and the nitrate-containing catalyst was also placed in the quartz tube upstream of the PtZSM-5. Calcination was begun by raising the temperature in a stream of nitrogen and air but without addition of ammonia. The effluent $NO_x$ was measured, then $NH_3$ addition started, and the effluent $NO_x$ again observed.

The results of this experiment with the PtZSM-5 at 327° C. and at 343° C. are shown in Table VI. In each case the gas flow rate was 1200 Volumes/Vol. Catalyst/hr.

TABLE VI

ABATEMENT SIMULATION

| Temp. of PtZSM-5, °C. | Effluent $NO_2$, ppm Without $NH_3$ | Effluent $NO_2$, ppm With $NH_3$ | Percent Conversion |
|---|---|---|---|
| 327 | 2000 | less than 2 | 99.9 plus |
| 343 | 1700 | less than 0.5 | 99.9 plus |

Example 7

Figure 3:
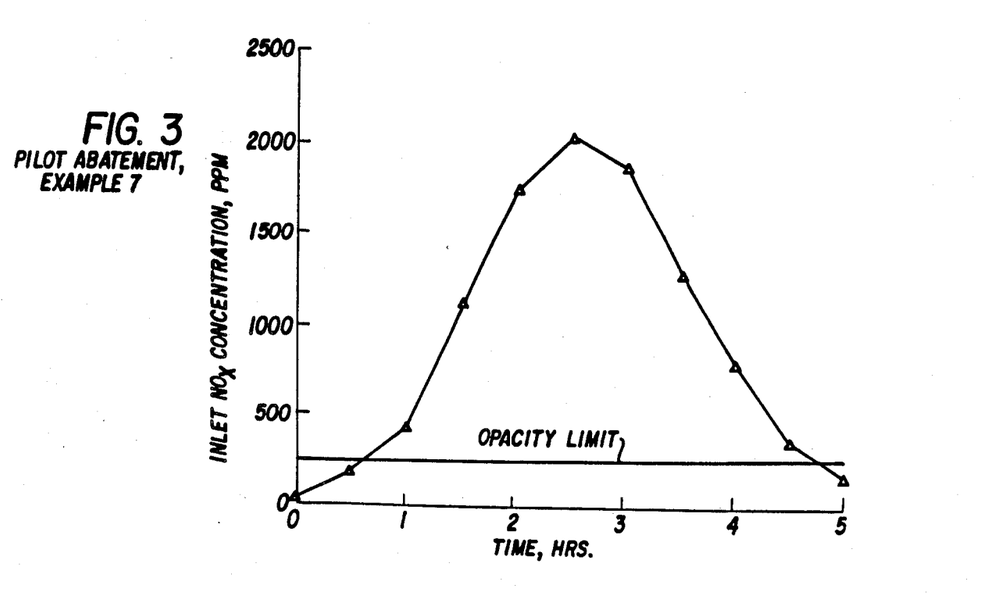
FIG. 3 shows inlet $NO_x$ concentration to pilot abatement unit.

This example describes the results of a test with a pilot abatement unit fed by $NO_x$-contaminated exhaust gas produced by a commercial retort. The commercial retort was used to calcine an inorganic catalyst impregnated with metal nitrate salt in order to convert the nitrate to oxide. This was done batchwise in a flow of nitrogen mixed with air. Each batch required about six hours to complete the calcination. During calcination, the exhaust gas composition increased in $NO_x$ content during the first three hours, and then decreased. (See e.g. FIG. 3).

Figure 2:
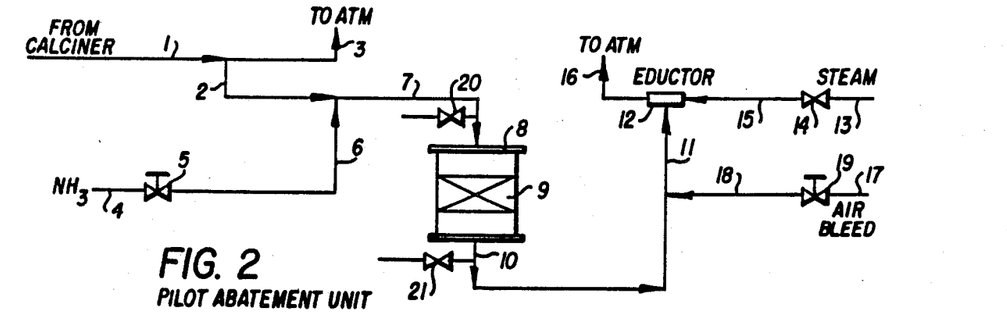
FIG. 2 is a schematic diagram of a pilot plant $NO_x$ abatement unit.

FIG. 2 of the drawing is a schematic diagram of the pilot abatement unit. The exhaust from the calciner normally was discharged to the atmosphere via lines (1) and (3). To install the abatement unit, a 4-inch pipe (2) was joined to the stack to divert a portion of the exhaust which was fed via line (7) to a carbon-steel vessel (8) which contained the abatement catalyst (9). After passage through the catalyst, the treated exhaust gas was withdrawn via line (10) and (11), passed through eductor (12) and exhausted via stack (16). Steam for the eductor was provided via line (13), control valve (14) and line (15), and exhausted via stack (16). An air bleed flow control trim was provided by lines (17) and (18) and control valve (19). Provision for controlled ammonia addition were provided via line (4), valve (5) and line (6). Valves (20) and (21) provided for sampling the feed and product gases from vessel (8). Temperature was measured by a thermocouple (not shown in the drawing) located at the center of the catalyst bed.

Figure 4:
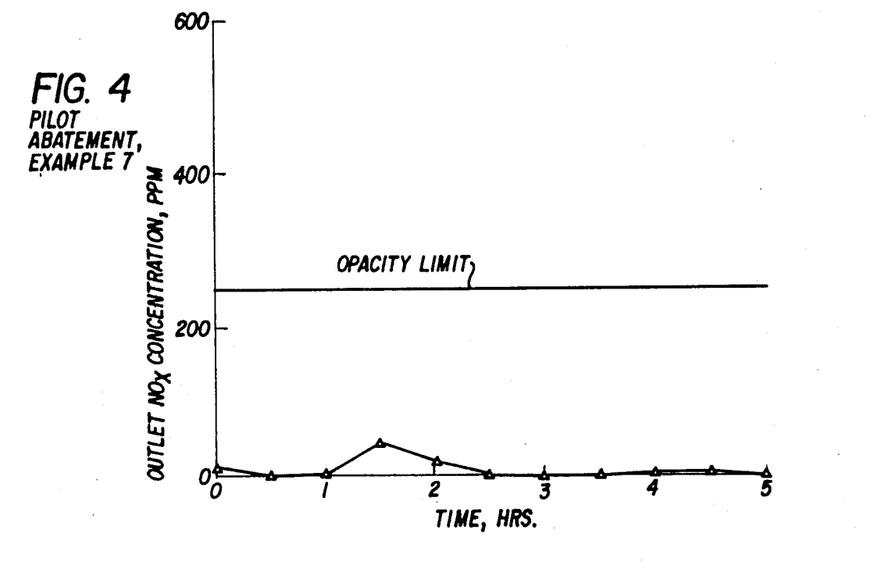
FIG. 4 shows effluent $NO_x$ concentration from pilot abatement unit.
Figure 5:
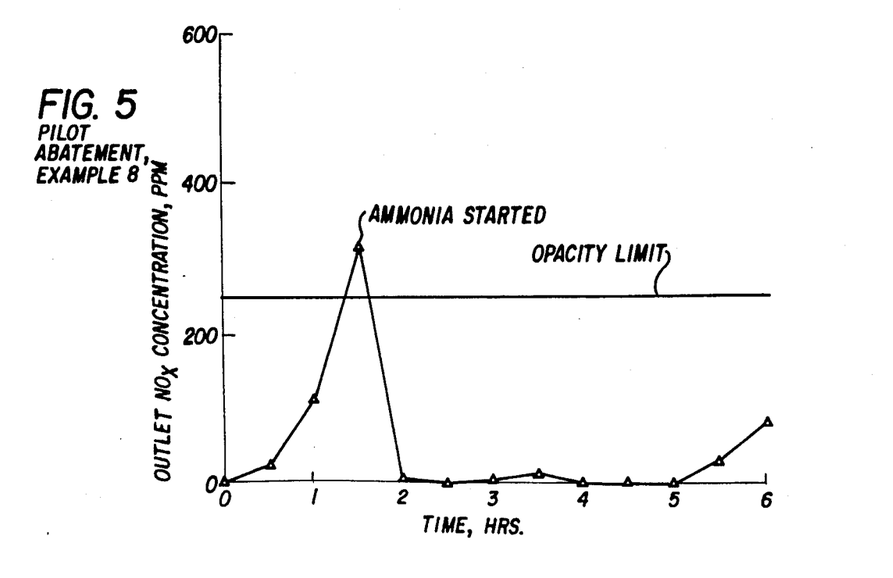
FIG. 5 shows effluent $NO_x$ concentration from pilot abatement unit.

A test of the effectiveness of the abatement unit was made by loading about 400 lbs. of fresh NiZSM-5 catalyst onto a bed of alumina balls in vessel (8). The calciner was loaded with a batch of nitrate-containing catalyst and calcined in the usual manner in a stream of nitrogen mixed with air. The flow of ammonia was adjusted to suppress $NO_x$ emissions from the pilot unit by providing a slight excess of ammonia. The inlet and outlet $NO_x$ concentrations measured by EPA Method No. 7 are shown graphically in FIGS. 3 and 4 of the drawings. Also shown is the level of emissions allowable in the locality of the test, specified as an opacity limit and estimated to correspond to about 250 ppm of $NO_x$. The gases from the calciner consisted principally of nitrogen with about 4 to 5 volume percent of oxygen and the balance $NO_x$. It was estimated that the $NO_x$ contained about 2 mols of $NO_2$ per mol of NO.

Along with data obtained by the EPA Method No. 7, data was also obtained by chemiluminescent analysis and with Drager tubes. In general, the EFA Method gave $NO_x$ values which were slightly higher than chemiluminescent values up to 400 ppm, but the two methods diverged by a much as 50% at 2000 ppm. The reason for this is not understood at this time, and the discrepancy does not detect from the impressive performance of the pilot unit. The results obtained with the chemiluminescent method are shown in Table VII.

TABLE VII
(EXAMPLE 7)
Chemiluminescent Method

| Elapsed Time | Pilot Plant Inlet | | | Pilot Plant Outlet | |
|---|---|---|---|---|---|
| | Gas Flow Rate dscf/hr (1) | $NO_x$ ppm dry | $NO_x$ lb/hr (2) | $NO_x$ ppm dry | $NO_x$ lb/hr (2) |
| 0007 | 12,048 | 22.5 | 0.032 | 2.5 | 0.004 |
| 0030 | 12,048 | 36 | 0.052 | 3.5 | 0.005 |
| 0100 | 12,013 | 148 | 0.212 | 6.5 | 0.009 |
| 0130 | 11,766 | 455 | 0.639 | 26.5 | 0.037 |
| 0200 | 11,940 | 820 | 1.17 | NA | NA |
| 0210 | 11,940 | 930 | 1.33 | 72 | 0.103 |
| 0230 | 11,831 | 1088 | 1.54 | 24 | 0.034 |
| 0236 | NA | NA | NA | 14.5 | 0.020 |
| 0300 | 11,715 | 1125 | 1.57 | NA | NA |
| 0330 | 11,558 | 1038 | 1.43 | NA | NA |
| 0340 | 11,558 | 1000 | 1.38 | NA | NA |
| 0353 | 11,405 | 830 | 1.13 | NA | NA |
| 0418 | 11,405 | 610 | 0.831 | NA | NA |
| 0436 | 12,014 | 450 | 0.646 | NA | NA |
| 0450 | 12,014 | 350 | 0.502 | NA | NA |
| 0500 | 7,016 | 290 | 0.243 | NA | NA |
| 0530 | 7,025 | 165 | 0.138 | NA | NA |
| 0600 | 7,025 | 100 | 0.084 | NA | NA |

(1) dscf = dry cubic feet per hour at 20° C., 29.92" Hg
(2) lb/hr as $NO_2$ =
$$\frac{\text{ppm } NO_x \times \text{Molecular weight of } NO_2}{24.04} \times 6.242 \times 10^{-8} \times Qsd$$

Example 8

The same pilot abatement unit described in Example 7 was used in this example. For this test, however, the catalyst used in Example 7 was replaced by about 100 lbs. of the same type catalyst as used in Example 7 except that, instead of fresh catalyst, catalyst that had become spent in a commercial hydrocarbon conversion process was used.

The test was conducted with a smaller batch of nitrate-containing catlyst in the calciner. The results of this test are summarized in Table VIII.

The abatement catalyst was operated at about 232° C. to 400° C. in Examples 7 and 8.

TABLE VIII
(EXAMPLE 8)
EPA Method No. 7

| Elapsed Time | Pilot Plant Inlet | | | Pilot Plant Outlet | |
|---|---|---|---|---|---|
| | Gas Flow Rate dscf/hr (1) | $NO_x$ ppm dry | $NO_x$ lb/hr (2) | $NO_x$ ppm dry | $NO_x$ lb/hr (2) |
| 0034 | 8,434 | 2.3 | 0.002 | 0.7 | 0.001 |
| 0100 | 8,400 | 31.5 | 0.032 | 21.7 | 0.022 |
| 0130 | 11,525 | 143.0 | 0.197 | 115.0 | 0.158 |
| 0200 | 11,798 | 380.0 | 0.536 | 319.5 | 0.450 |
| 0230 | 11,888 | 715.4 | 1.02 | 4.3 | 0.006 |
| 0300 | 11,660 | 1027.8 | 1.43 | 0.0 | 0.001 |
| 0330 | 12,652 | 1193.8 | 1.80 | 3.8 | 0.006 |
| 0400 | 12,465 | 1086.1 | 1.62 | 11.3 | 0.017 |
| 0430 | 12,823 | 913.0 | 1.40 | 0.0 | 0.001 |
| 0500 | 12,746 | 628.3 | 0.957 | 0.0 | 0.001 |
| 0530 | 12,601 | 415.4 | 0.625 | 0.0 | 0.001 |
| 0600 | 12,374 | 221.5 | 0.327 | 29.4 | 0.043 |
| 0630 | 12,260 | 150.3 | 0.220 | 81.2 | 0.119 |

(1) dscf = dry cubic feet per hour at 20° C., 29.92" Hg
(2) lb/hr as $NO_2$ =
$$\frac{\text{ppm } NO_x \times \text{Molecular weight of } NO_2}{24.04} \times 6.242 \times 10^{-8} \times Qsd$$

Example 9

In this example a 0.5 barrel per day fluid catalytic cracking pilot plant was used as a source of $NO_x$-contaminated exhaust gas. A slip-stream of the flue gas from the regenerator was taken, mixed with about a stoichio-metric amount of ammonia and passed through a 200 cc bed of spent commercial NiZSM-5 catalyst as used for Example 8. The abator bed temperature was varied from 282° C. to 413° C. The results of this example are shown in Table IX.

TABLE IX
(Example 9)
FCC-flue gas treatment

| GHSV, V/V | Temp. °C. | $NO_x$, ppm Inlet | $NO_x$, ppm Outlet |
|---|---|---|---|
| 3200 hr$^{-1}$ | 282 | 550 | 200 |
| 3200 | 282 | 550 | 150 |

TABLE IX-continued (Example 9)
FCC-flue gas treatment

| GHSV, V/V | Temp. °C. | $NO_x$, ppm Inlet | Outlet |
|---|---|---|---|
| 2900 | 391 | 600 | 200 |
| 2900 | 399 | 600 | 200 |
| 1500 | 407 | 600 | 100 |
| 1500 | 413 | 600 | 50 |

Dynamic Responsiveness of Catalyst

Figure 6:
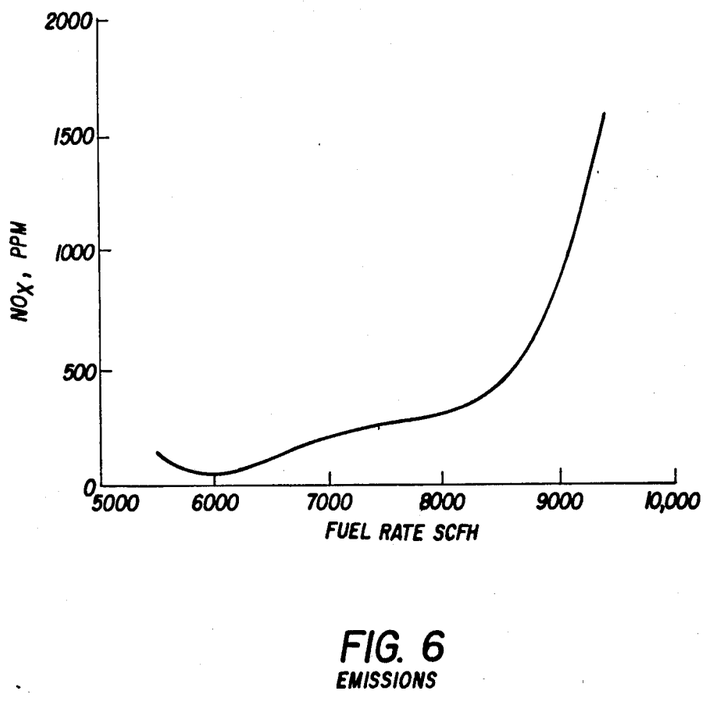
FIG. 6—Emissions v. Loading, 2 cycle engine.

We shall now describe in detail the apparatus and method used to characterize the speed of response of a catalyst to changes in the rate of feed of one of the reactants. Such changes may occur in a relatively slow manner, such as shown in the kiln operation of Example 7 and FIG. 3; or in a very rapid manner, such as with a large increase in loading of a stationary internal combustion engine, as illustrated by FIG. 6 of the drawing. The speed of response to a step change in $NO_x$ input, measured as described below, is referred to herein as the DRI (Dynamic Response Index) of the catalyst.

Apparatus:

A schematic of the experimental apparatus is shown in FIG. 1 of the drawing. The apparatus consists of a quartz tubular reactor which is heated by a Lindbergh electrical furnace. The temperature of the catalyst bed is measured using a thermocouple and this in turn is used to adjust the temperature of the furnace to the desired value. The catalyst is crushed and sieved to 8-14 mesh and placed in the reactor with quartz wool and chips placed before and after the reactor as packing. $NO_2$ and $NH_3$ are fed into the heated zone of the reactor separately, since any contact between the two gases at temperatures below 204° C. results in the formation of $NH_4NO_3$. The oxygen for the reaction is suppled as air and is co-fed with the $NO_2$.

On-line analysis of $NO_2$ and $NH_3$ were carried out using Draeger tubes. These tubes are filled with support material impregnated with suitable chemicals that react with the gases to be measured to form a discoloration. The total length of the discoloration along the tube is a measure of the concentration. Draeger tubes are good for order of magnitude measurements of concentration.

Procedure:

All DRI measurements reported herein, unless explicitely stated to be under different conditions, were performed with 10 cc of catalyst and at a GHSV of 6000 (calculated at room temperature) and at 343° C. with an inlet concentration of 1000 ppm of $NO_2$. $NH_3$ and $O_2$ were maintained in excess of the stoichiometric levels based on the following reaction $$2NO_2 + 4NH_3 + O_2 = 3N_2 + 6H_2O$$

The $NO_2$ and $NH_3$ used in the above experiments were supplied by Matheson as 1% and 5% mixtures in $N_2$, respectively. In addition, nitrogen was used as a diluent in all the above experiments.

The experimental procedure consisted of heating the catalyst bed to about the desired temperature, while maintaining a flow of nitrogen through the bed. At this point $NO_2$ is introduced into the reactor and its outlet concentration is allowed to increase to the measured value at the reactor inlet. Next, air and $NH_3$ are introduced into the reactor and the reactor temperature is adjusted to the desired value after a mild exotherm has passed through the catalyst bed. While the oxygen was 50% in excess of stoichiometric levels, the $NH_3$ entering the reactor was adjusted to maintain an outlet concentration of at least 25 ppm. Once steady operating conditions have been established, the reaction is allowed to proceed for 30 minutes, during which period the $NO_2$ and $NH_3$ concentrations are measured frequently to ensure a steady state. At this time the percent $NO_x$ conversion is noted.

Figure 7:
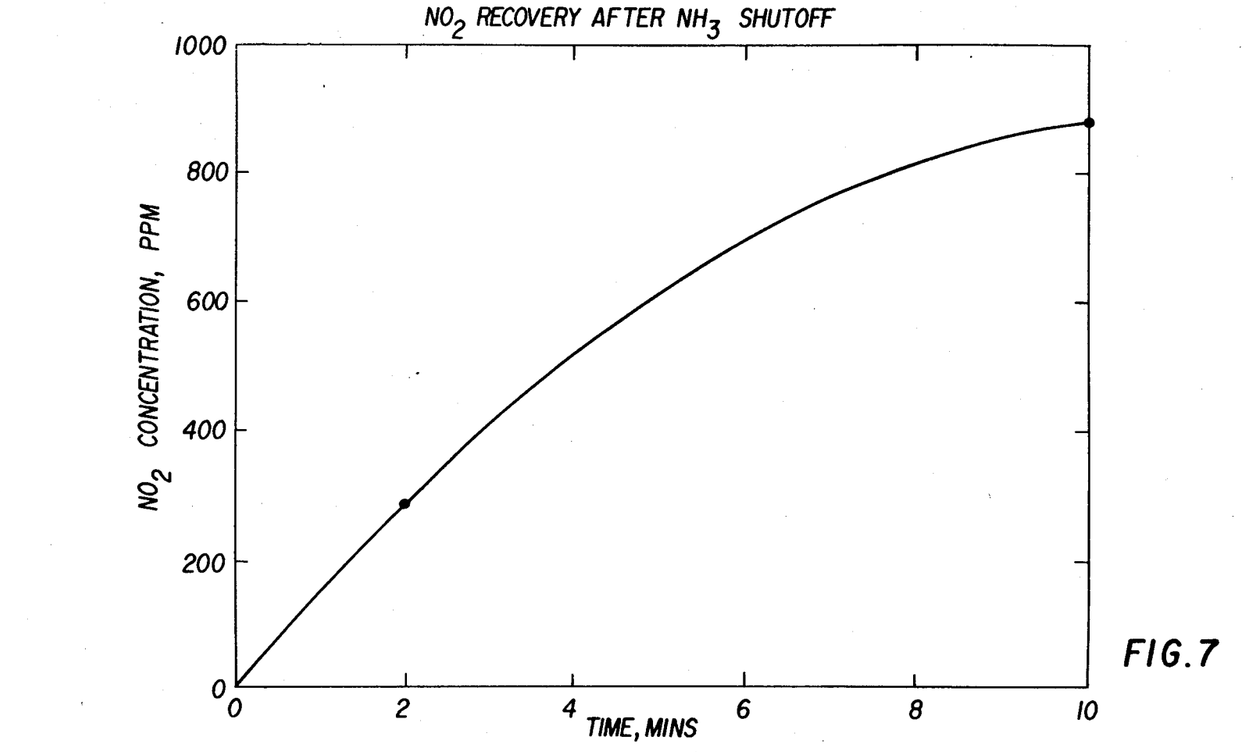
FIG. 7—$NO_2$ recovery after $NH_3$ shutoff.

At the end of the steady state period, the $NH_3$ feed to the reactor is shut off and the $NO_2$ concentration at the reactor outlet is measured until it returns to its initial value. The time required for the $NO_2$ concentration at the reactor outlet to reach 63% of its final value is estimated to the nearest one tenth of a minute by mathematical interpolation from the $NO_2$ recovery curve, and this value is taken as the time constant, $t_c$, for the catalyst under examination. A typical $NO_x$ recovery curve is shown in FIG. 7, and is approximately first order. The decay of $NO_x$ conversion reflects the reaction with sorbed ammonia which follows a curve that is the mirror image of FIG. 7. It can be shown mathematically that the ratio of the time constants for any two samples closely approximates the ratio of the ammonia desorbed.

The use of the time constant for pseudo first order reactions is described in *Process Control*, Peter Harriott, pp 24-25, Mc Graw Hill Book Company, which description is incorporated herein by reference for background.

The Dynamic Response Index for a catalyst is calculated from the time constant, $t_c$, from the relation $$DRI = 100 \times (t_{ref}/t_c)$$

in which $t_{ref}$ is a reference time constant, arbitrarily assigned a value of 4.0 minutes, to provide a convenient DRI scale.

Examples 10-15 which follow illustrate the large favorable effect obtained by aging the catalyst prior to contact with $NO_x$ in the abatement process of this invention. Examples 10-15 all were run with a zeolite having a silica to alumina ratio of 26:1 and the essential X-ray diffraction pattern of ZSM-5. The treatments included steaming at different severities, and conversion to the sodium form, each of which results in a decrease in activity for acid catalyzed reactions with but little effect on the activity of the catalyst for reduction of $NO_x$ by ammonia. The results are summarized in Table X.

TABLE X (Examples 10-15)

| Example NO. | Catalyst NO. | Catalyst Treatment | DRI | alpha value | % $NO_x$ CONV. |
|---|---|---|---|---|---|
| 10 | 1 | $NH_4^+$ exchanged and calcined | 6 | 1357 | 94 |
| 11 | 2 | Cat No. 1 steamed | 14 | 1006 | 70 |
| 12 | 3 | Cat No. 2 steamed | 33 | 154 | 76 |
| 13 | 4 | Cat No. 1 steamed | 49 | 58 | 83 |
| 14 | 5 | Cat No. 1 steamed | 100 | 32 | 90 |
| 15 | 6 | Cat No. 1 $Na^+$ exchanged to equimolar ratio $Na:Al_2O_3$ | 100 | 1 | 69 |

Example 16

A retained sample of the fresh Ni-ZSM-5 catalyst used in Example 7 was evaluated for its DRI value. The catalyst, which had an alpha value of 100, was found to have a DRI of 24. The $NO_x$ conversion noted in the DRI test was 90%.

Example 17

A retained sample of the spent Ni-ZSM-5 catalyst used in Example 8 was evaluated for its DRI value. Th catalyst, which had an alpha value of 62, was found to have a DRI of 20. The $NO_x$ conversion noted in the DRI test was 70%.

Examples 10–17 show the dramatic increase in DRI produced by deactivation of the hydrogen form zeolite of Example 10 to reduce its activity for acid catalyzed reactions. In particular, Examples 10–15 show a variation of the DRI from a value of 6 for Example 10 to a value of 100 for Examples 14 and 15, which is a 17-fold variation from the fastest-responding catalyst to the slowest. At the same time, the six samples show a $NO_x$ conversion in the DRI test ranging from minimum to maximum values of 69% and 94%, which is about a 1.4 fold variation. There is no systematic variation of the $NO_x$ conversion level, but even if it were systematic and inversely correlated with the DRI, the DRI advantage as one progresses from Example 10 to 15 would far outweigh the relatively small loss of catalytic activity which could be readily compensated, e.g. by a small reduction of space velocity. The results of Examples 16 and 17 are consistent with the above observations.

The decline in acid catalytic activity over the 1300-fold change in alpha value shows a negative correlation with the speed of response (DRI).

The above examples show that a $NO_x$ redction process having rapid dynamic response to changes in the $NO_x$ throughput in the reactor is provided by a catalyst comprising a porous crystalline siliceous solid having a moderate to relatively low activity for acid catalyzed reactions, as measured by an alpha value in the range of 10 to 250, or 20 to 150, or 20 to 100. As indicated by Examples 10–17, such moderate acid activity could be achieved by steaming, by the addition of metallic cations to the zeolite, or by the use of an acidic crystalline solid which has become aged in use as an acidic organic conversion catalyst, or by combinations of such means or by synthesis means. Steam combination often is responsible for the deterioration in performance of a commercial organic or hyudrocarbon conversion catalyst.

For purposes of the present invention, the term "aged" will be used to include a crystalline siliceous material the alpha value of which has been reduced in commercial use as an organic or hydrocarbon conversion catalyst (i.e. naturally aged), and such material that has been steamed, e.g. at 800° to 1200° F., and such material that has added metallic cations that reduce the alpha value, and materials for which the alpha value has been reduced by a combination of such means.

The preferred method for introducing metallic cations is conventional ion-exchange. Alkali and alkaline earth metal cations are highly effective for controlling the acid activity, the alkaline earth metal cations being preferred. Particularly preferred are calcium and magnesium.

What is claimed is:

1. A method for pretreating prior to discharge to the atmosphere an industrial exhaust gas contaminated with $NO_x$, which method comprises:

forming at a temperature of at least about 200° C. a mixture of said exhaust gas and added ammonia, said ammonia being added in an amount to satisfy approximately the stoichiometric requirement for reduction of the $NO_x$ by $NH_3$; and, contacting said mixture at 200° C. to about 600° C. and at a gas hourly space velocity effective to substantially reduce said $NO_x$ content with a commercial, spent organic conversion catalyst, said catalyst comprising a crystalline zeolite having a silica to alumina ratio of at least about 50 and a Constraint Index of 1 to 12.

2. The method of claim 1 wherein said crystalline zeolite is selected from the group consisting of ZSM-5, ZSM-11, ZSM-12, ZSM-21, ZSM-23, ZSM-35, ZSM-38 and ZSM-48.

3. The method of claim 2 wherein said crystalline zeolite is in the hydrogen form.

4. The method of claim 2 wherein said catalyst contains from 2 ppm up to about 1 wt % of a platinum group metal.

5. The method of claim 3 wherein said catalyst contains up to about 2 wt % nickel and said zeolite is ZSM-5.

6. A process for selectively reducing oxides of nitrogen in a mixture of gases containing oxygen, reducible oxides of nitrogen, and nitrogen, which process comprises contacting in a reaction zone said mixture of gases and approximately the stoichiometric amount of added ammonia needed to reduce said reducible nitrogen oxides to nitrogen, said contacting being conducted at a temperature of 200° C. to about 600° C. with a spent commercial hydrocarbon conversion catalyst, said catalyst comprising a crystalline zeolite having a silica to alumina ratio of at least about 50 and selected from the group consisting of ZSM-5, ZSM-11, ZSM-12, ZSM-21, ZSM-23, ZSM-35, ZSM-38 and ZSM-48.

7. The method of claim 6 wherein said zeolite is in the hydrogen form.

8. The method of claim 6 wherein said mixture of gases is generated by calcining an inorganic composition that contains a metal nitrate salt.

9. The method of claim 6 wherein said mixture of gases is the exhaust from a stationary engine operating with a lean mixture of air and natural gas as fuel.

10. The method of claim 6 wherein said mixture of gases is the flue gas discharge from the regenerator of a fluid catalytic cracking unit.

11. In a process for the fluid catalytic cracking of a petroleum fraction which comprises contacting said fraction in a cracking unit with a fluid cracking catalyst whereby forming cracked products and deactivated catalyst containing a carbonaceous deposit, separating said deactivated catalyst from said cracked products, passing said deactivated catalyst to a regeneration unit where it is contacted at elevated temperature with an oxygen-containing gas whereby forming regenerated catalyst and a flue gas contaminated with $NO_x$, discharging said flue gas, and recycling said regenerated catalyst, the improvement which comprises:

adding prior to said flue gas discharging step an approximately stoichiometric amount of $NH_3$ to said flue gas and contacting the resultant mixture at 200° C. to 600° C. with a commercial, spent organic conversion catalyst, said catalyst comprising a crystalline zeolite having a silica to alumina ratio of at least about 50 and a Constraint Index of 1 to 12 whereby converting said $NO_x$ to an innocuous gas, and thereafter discharging said treated flue gas.

12. The method of claim 11 wherein said contacting is effected by injection of said catalyst into said flue gas.

13. The method of claim 11 in which said contacting is effected with catalyst contained in a fixed, a fluid, or a moving bed.

14. The process of claim 1 or claim 2 or claim 3 or claim 4 or claim 6 or claim 7 or claim 8 or claim 9 or claim 10 or claim 11 or claim 12 or claim 13 wherein said crystalline zeolite is ZSM-5.

15. A method for pretreating prior to discharge to the atmosphere an industrial exhaust gas contaminated with $NO_x$, which method comprises:

forming at a temperature of at least about 200° C. a mixture of said exhaust gas and added ammonia, said ammonia being added in an amount to satisfy approximately the stoichiometric requirement for reduction of the $NO_x$ by $NH_3$; and contacting said mixture at 200° C. to about 600° C. and at a gas hourly space velocity effective to substantially reduce said $NO_x$ content with a spent organic conversion catalyst comprising ZSM-5 or ZSM-11 crystalline zeolite.

16. The method of claim 15 wherein said ZSM-5 zeolite is in the hydrogen form.

17. A process for pretreating prior to discharge to the atomosphere an industrial exhaust gas contaminated with an ecologically unacceptable amount of $NO_x$, which method comprises forming at a temperature of at least about 200° C. a mixture of said exhaust gas and a variable, controlled amount of added ammonia, said amount being effective to reduce said $NO_x$ content of said discharged gas to an acceptable level, and contacting said mixture at 200° C. to at least about 600° C. with a catalyst comprising a porous crystalline siliceous solid having a pore size of at least 5 A.U., a silica to alumina ratio of at least 20, an alpha value of at least about 10 to 250, and a Dynamic Response Index (DRI) of at least 20, thereby avoiding the discharge or excessive concentrations of both $NO_x$ and ammonia.

18. The process described in claim 17 wherein said porous crystalline siliceous material has a silica to alumina ratio of at least 20 and a Constraint Index of 1 to 12.

19. The process described in claim 18 wherein said porous crystalline siliceous material has the structure of ZSM-5 or ZSM-11 or ZSM-12 or ZSM-21 or ZSM-23 or ZSM-35 or ZSM-38 or ZSM-48.

20. The process of claim 18 wherein said zeolite has the structure of ZSM-5.

21. A process for controllably pretreating prior to discharge to the atmosphere an industrial exhaust gas contaminated with $NO_x$, said process comprising:

contacting, at a temperature of about 200° C. to at least about 600° C., a mixture of said exhaust gas, and added ammonia, with a solid inorganic acid catalyst comprising an acid-resistant porous crystalline siliceous solid having a silica to alumina ratio of at least 20 and that is deactivated for acid catalyzed reaction prior to said contact with said mixture, said crystalline silicate having a pore size of at least 5 Anstroms, said deactivation being effective to increase its Dynamic Rsponse Index (DRI) to at least 20 without substantially affecting the activity of said catlyst for selective catalytic reduction of $NO_x$.

22. The process described in claim 21 wherein said deactivation of said catalyst for acid catalyzed reaction is effected by steaming, by the incorporation of metallic cations, by use in an acid catalyzed reaction, or by combinations thereof.

23. The process described in claim 22 wherein said metallic cations are selected from the group consisting of akali and alkaline earth metal cations.

24. The process described in claim 22 wherein said deactivation of said catalyst for acid catalyzed reaction is effected by steaming.

25. The process described in claim 21 wherein said deactivation of said catalyst for acid catalyzed reaction is effective to increase the DRI to a value of at least 33.

26. The process described in claim 21 wherein said porous crystalline siliceous solid has the structure of ZSM-5.

27. The process described in claim 22 wherein said porous crystalline siliceous solid has the structure of ZSM-5.

28. The process described in claim 23 wherein said porous crystalline siliceous solid has the structure of ZSM-5.

29. The process described in claim 24 wherein said porous crystalline siliceous solid has the structure of ZSM-5.

30. The process described in claim 25 wherein said porous crystalline siliceous solid has the structure of ZSM-5.

* * * * *

UNITED STATES PATENT AND TRADEMARK OFFICE
CERTIFICATE OF CORRECTION

PATENT NO. : 4,778,665

DATED : October 18, 1988

INVENTOR(S) : T. R. Kiliany, S. Krishnamurthy, J. P. McWilliams, D. A. Pappal and C. T. Sigal It is certified that error appears in the above-identified patent and that said Letters Patent is hereby corrected as shown below:

Col. 7, line 16, "particulary" should read --particularly--.
Col. 12, line 16, "ws" should read --was--.
Col. 13, line 37, "EFA" should read --EPA--.
Col. 13, line 40, "a" should read --as--.
Col. 13, line 42, "detect" should read --detract--.
Col. 14, line 55, "stoichio-metric" should read --stoichiometric--.
Col. 14, line 56, "200" should read --100--.
Col. 17, line 43, after "Steam" insert --and the acquisition of metal contaminants either alone or in--.
Col. 17, line 45, "hyudrocarbon" should read --hydrocarbon--.
Col. 19, line 24, "atomosphere" should read --atmosphere--.
Col. 19, line 36, "or" should read --of--.
Col. 20, line 15, "Rsponse" should read --Response--.
Col. 20, line 17, "catlyst" should read --catalyst--.
Col. 20, line 26, "akali" should read --alkali--.

Signed and Sealed this

Third Day of October, 1989

Attest:

DONALD J. QUIGG

Attesting Officer

Commissioner of Patents and Trademarks